Figure 16:
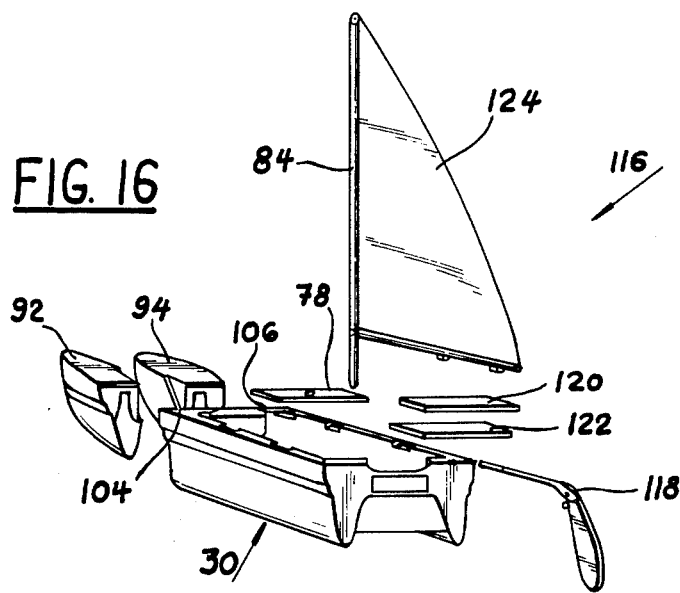

United States Patent [19]

Buirski et al.

[11] 4,236,474

[45] Dec. 2, 1980

[54] BOATS

[75] Inventors: David P. Buirski, Cape Town; Peter H. Hedley, Hermanus, both of South Africa

[73] Assignee: Cat-A-Van Associates, Baltimore, Md.

[21] Appl. No.: 950,800

[22] Filed: Oct. 12, 1978

[30] Foreign Application Priority Data

Oct. 14, 1977 [ZA] South Africa ............ 77/6123

[51] Int. Cl.³ .................................. B63B 1/00
[52] U.S. Cl. ............................ 114/56; 114/61; 114/39; 114/77 R; 296/157; 9/2 S
[58] Field of Search ............ 114/77 R, 61, 56, 39; 9/1.2, 2 S; 115/1 R; 296/28, 23 B, 157

[56] References Cited

U.S. PATENT DOCUMENTS

| 2,591,380 | 4/1952 | Schreiner | 296/28 |
|---|---|---|---|
| 2,685,270 | 8/1954 | Pieraccioni | 9/2 S |
| 3,090,973 | 5/1963 | Levinson | 9/1.2 |
| 3,364,509 | 1/1968 | Lapworth | 115/17 |
| 3,883,909 | 5/1975 | Fisher | 114/61 |
| 3,916,468 | 11/1975 | Tetreault | 9/2 S |
| 3,933,112 | 1/1976 | Veazey | 115/1 R |
| 4,052,761 | 10/1977 | Rilling | 9/2 S |

*Primary Examiner*—Trygve M. Blix
*Assistant Examiner*—D. W. Keen
*Attorney, Agent, or Firm*—Diller, Ramik & Wight

[57] ABSTRACT

A boat which includes a hull body. The hull body includes a floor; two longitudinal walls and two end walls, each wall having a top face, the walls being joined together at their meeting ends into a substantially rectangular shape, and also are joined to the floor. There further are provided holding apparatus for holding the top faces of the four walls of the hull body in inverted fashion against an open-load-carrying part of a transportation vehicle; and connection apparatus for connecting at least one hull extension member and other additional members to the hull body.

15 Claims, 18 Drawing Figures

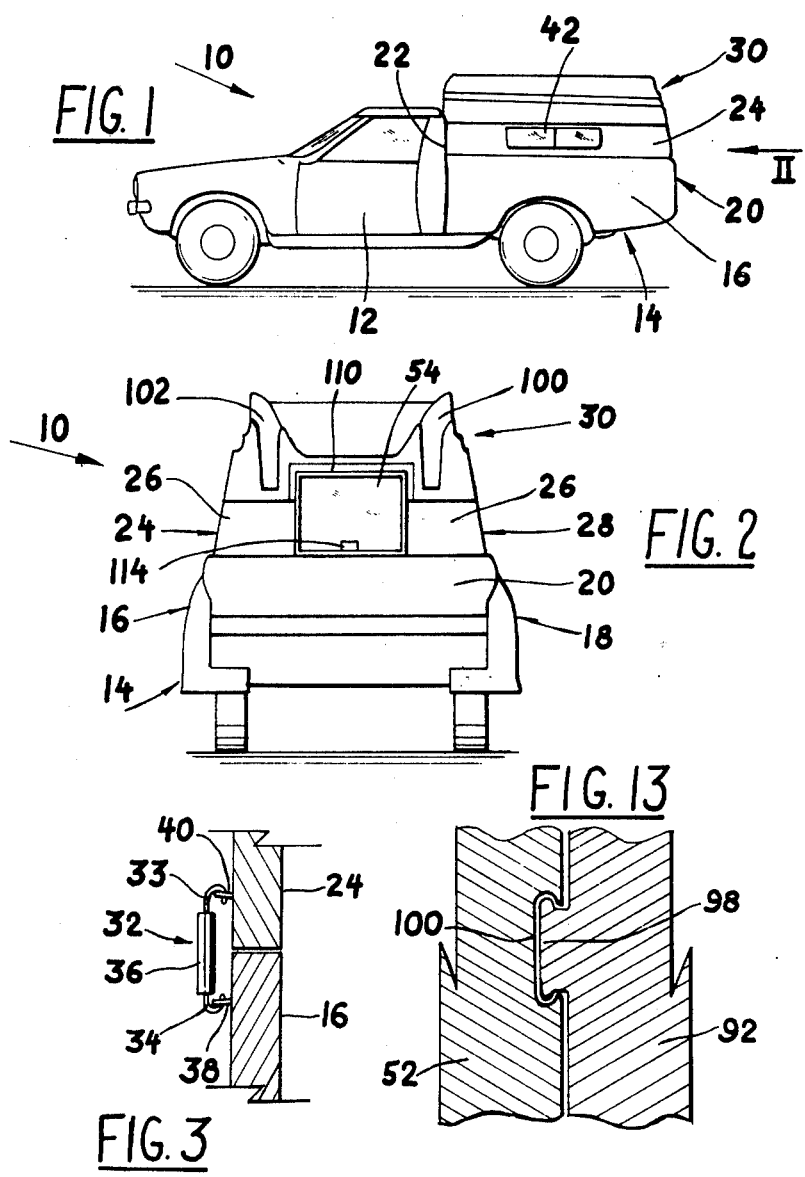

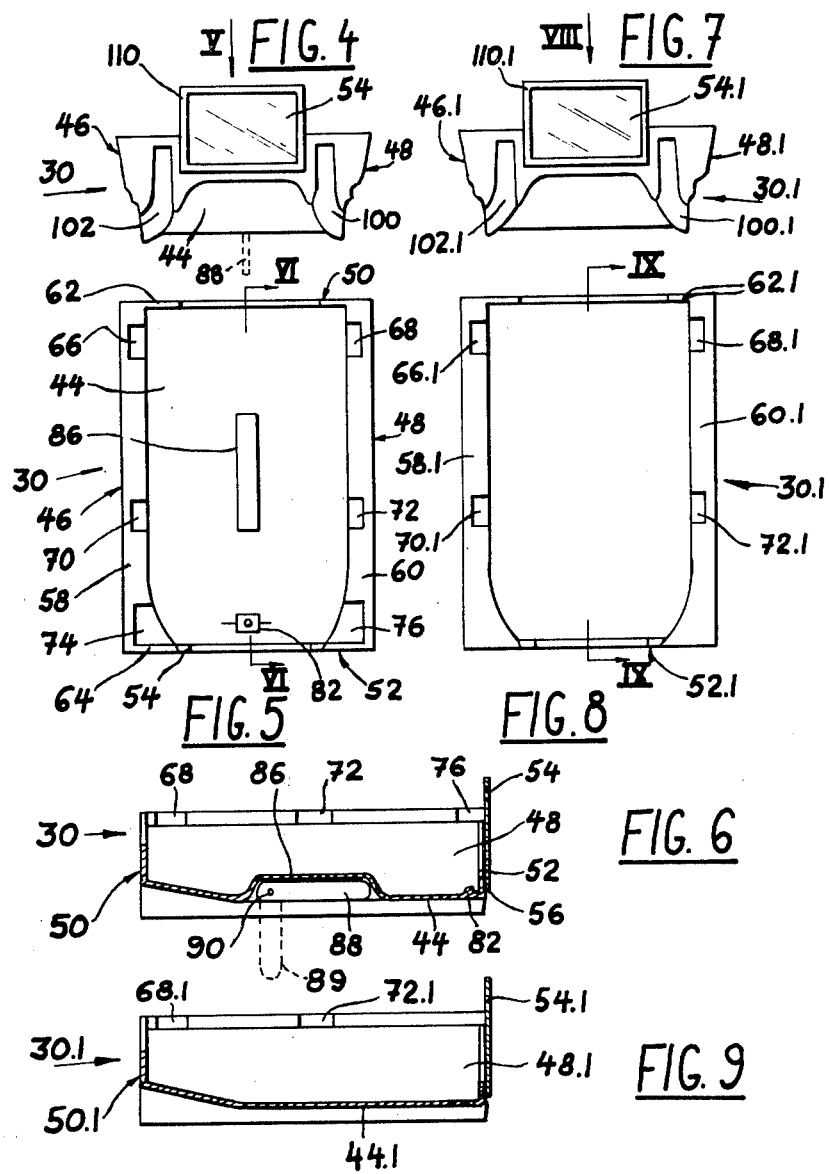

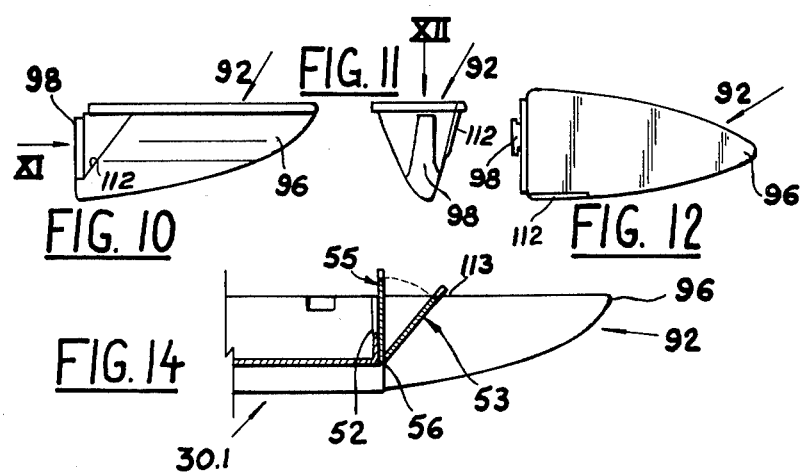
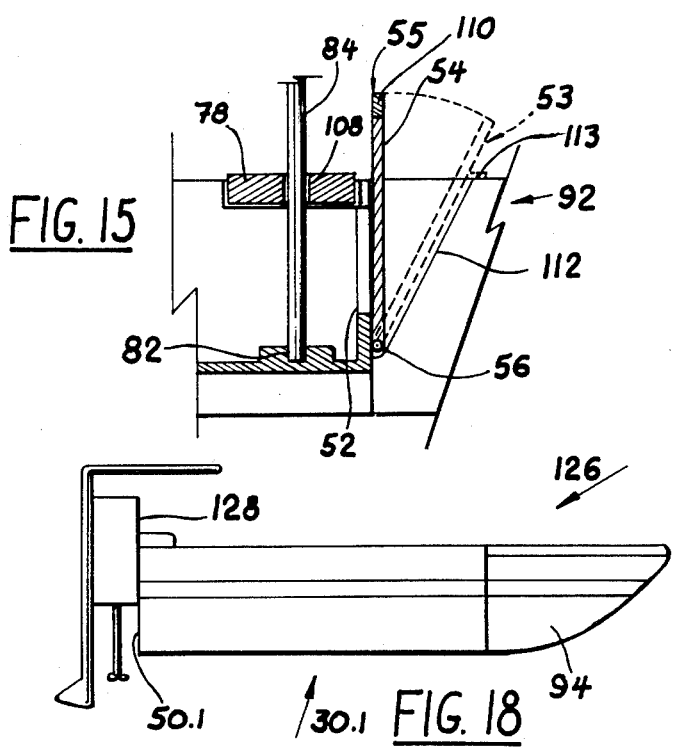

BOATS

The present invention relates to boats.

More particularly the invention relates to boats which can be used as canopies of load-carrying vehicles.

According to the invention, a boat includes a hull body comprising:
 (a) a floor;
 (b) two longitudinal walls and two end walls, each wall having a top face, the walls being joined together at their meeting ends into a substantially rectangular shape, and also are joined to the floor;
 (c) holding means for holding the top faces of the four walls of the hull body in inverted fashion against an open-load-carrying part of a transportation vehicle; and
 (d) connection means for connecting at least one hull extension The boat may include additional members comprising at least one body hull extension member for removable connection to the hull body; and boat accessory members.

The body hull extension member may be a bow part.

The boat may be a catamaran, and the body hull extension member may include two hull elements adapted to be attached in spaced relationship to connection means provided at one end wall of the hull body.

The one end wall may include a window, and the window may be movable so as to form a splash board or plate.

The boat accessory members may include at least one removable bench, a centre board and a removable rudder, and the hull body may have receiving means for receiving the bench and the rudder removably.

The connection means for the body hull extension member may include a tapered formation provided on one end wall and tapering away from the floor, for cooperating with a complementary tapered formation on the hull extension member.

The boat may be a motor boat in which the one end wall may have attachment means for receiving removably an outboard motor and propellor screw arrangement.

The boat alternatively may be a sailing boat, and the boat accessory members may include at least one mast for sails, and the hull body may have receiving means for receiving such mast removably.

The invention also extends to a canopy for covering the open end of a load-carrying vehicle which includes a canopy body in the form of a boat hull including:
 (a) a floor;
 (b) two longitudinal walls and two end walls, each wall having a top face, the walls being joined together at their meeting ends into a substantially rectangular shape, and also are joined to the floor;
 (c) holding means for holding the top faces of the four walls of the hull body in inverted fashion against an open-load-carrying part of a transportation vehicle, and
 (d) connection means for connecting at least one hull extension member and other additional members to the hull body.

Also according to the invention, there is provided the combination of a load-carrying vehicle having an open load-carrying part and a canopy for covering the open end of the load-carrying vehicle, the canopy being in the form of boat hull including:
 (a) a floor
 (b) two longitudinal walls and two end walls, each wall having a top face, the walls being joined together at their meeting ends into a substantially rectangular shape, and also are joined to the floor;
 (c) holding means for holding the top faces of the four walls of the hull body in inverted fashion against the open load-carrying part of the transportation vehicle, and
 (d) connection means for connecting at least one hull extension member and other additional members to the hull body.

The invention will now be described by way of example with reference to the accompanying schematic drawings.

In the drawings there is shown in

Figure 17:
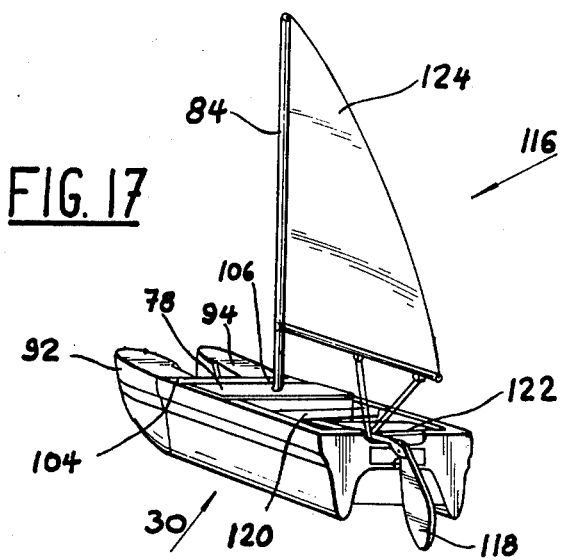

FIG. 1: A side view of a truck provided with a canopy in the form of a boat hull in accordance with the invention;

FIG. 2: A rear view of the truck and the canopy seen along arrow II in FIG. 1;

FIG. 3: on a larger scale, a sectional end view of a detail of one form of holding means for holding the canopy on the truck;

FIG. 4: A rear view of the canopy in inverted position as a boat hull, namely a sailing boat hull;

FIG. 5: A plan view of the boat hull seen along arrow V in FIG. 4;

FIG. 6: A sectional side view of the boat hull seen along arrows VI—VI in FIG. 5;

FIG. 7: A rear view of the canopy in inverted position as a boat hull, namely a motor boat hull;

FIG. 8: A plan view of the boat hull seen along arrow VIII in FIG. 7;

FIG. 9: A sectional side view of the boat hull seen along arrows IX—IX in FIG. 8;

FIG. 10: A side view of a boat hull extension part;

FIG. 11: A rear view of the part seen along arrow XI in FIG. 10;

FIG. 12: A plan view of the part seen along arrow XII in FIG. 11;

FIG. 13: on a larger scale, a sectional plan view showing one form of a connection between a hull extension part and a boat hull in accordance with the invention;

FIG. 14: A sectional side view showing the positions of the movable splash board/window;

FIG. 15: On a larger scale, a detail of the splash board of FIG. 14 and a mast fitted to the boat hull;

FIG. 16: A pictorial view of all elements constituting a sailing boat including a boat hull in accordance with the invention;

FIG. 17: A pictorial view of an assembled sailing boat; and

FIG. 18: A side view of a motor boat including a boat hull in accordance with the invention.

Referring to FIGS. 1 and 2, a load carrying vehicle in the form of a truck 10 is shown to have a driver's cab 12 and a rear loadcarrying part 14 having two side walls 16, 18, a rear wall 20 and a front cab wall 22. On the walls 16, 18, 20 spacer panels 24, 26, 28 are fitted and these are fitted to a canopy or inverted boat hull 30. The spacer panel 24 and half of the rear spacer panel 26 may be integral and of L-shape, and the spacer panel 28 and the remaining half of the rear spacer panel 26 may also be integral and of L-shape.

The spacer panels 24, 26, 28 preferably are held in position on the walls 16, 18, 20 by means of attachment clamps 32 as illustrated in FIG. 3. The clamps 32 have spring biassed hooks 32, 34 which are movably mounted on the clamp body 36; and respectively engage with eyes 38, 40 provided on the spacer panel 24 and the side wall 16. These hooks 32 are spaced as required. The same method of attachment is used for attaching the boat hull 30 to the spacer panels 24, 26, 28. (If necessary the horizontal meeting surfaces of the walls 16, 18, 20 and the panels 24, 26, 28 or of the panels 24, 26, 28 and the walls of the hull 30 may be shaped to provide a lock and prevent sideways movement, e.g. by having horizontally inclined meeting surfaces).

The spacer walls 24 and 28 may be provided with windows 42, which may be slidable.

Referring now also to FIGS. 4 to 8, it will be seen that the boat hull 30 (or 30.1) is of substantially rectangular shape in plan view.

In FIGS. 4 to 6 a boat hull 30 is illustrated which is intended for use as a sailing boat. In FIGs. 7 to 9 a boat hull 30.1 is illustrated which is intended for use as a motor boat. The same reference numerals will be used for similar parts in the sailing boat hull 30 and the motor boat hull 30.1, but in the latter case the suffix 0.1 is added.

Referring now to FIGS. 4 to 6, the sailing boat hull 30 has a floor 44 (or roof when serving as a canopy when it is on the vehicle as illustrated in FIGS. 1 and 2) to which are joined four walls, namely two longitudinal walls 46, 48 and two end walls 50, 52.

As is shown in FIG. 6 the end wall 52 is provided with a movable baffle plate 54, which if transparent, can also serve as a window when the boat hull is used as a canopy (see FIG. 2). (From FIGS. 14 and 15 it will be seen that in position 53 it serves as a baffle plate on a boat, and in position 55 it is a window on a canopy.) The plate 54 is pivoted along one edge 56 and is limited by the wall 52 and the ridges in the hull extension parts (see FIGS. 9 to 13).

The upper free flat faces 58, 60, 62, 64 of the walls 46, 48, 50, 52 of the hull 30 (when inverted) fit onto the upper flat faces of the spacer panels 24, 26, 28 and the driver's cab wall 22 and are locked thereto (e.g. by means of attachment clamps as illustrated in FIG. 3).

The walls 46, 48 have recess formations 66, 68 and 70, 72 for receiving seat bench panels (see FIGS. 16 and 17).

The walls 46, 48 further have recess formations 74, 76 for receiving a sail mast board 78 (see FIG. 15). The floor 44 has a reinforcement knob formation with a recessed blind hole 82 for receiving the end of a mast 84 (see FIG. 15).

In the centre of the hull floor 44 a longitudinal flat recess bulge 86 is provided for housing the centre board 88 hinged at 90. The board 88 is movable from its inoperative position as shown in FIG. 6 to its operative position 89 (shown in dotted lines) and vice versa by means of a control string passing through the floor 44.

Referring to FIGS. 7 to 9, a boat hull 30.1 for a motor boat is illustrated. Its parts are equivalent to those of the sailing boat hull 30 illustrated in FIGS. 4 to 6, but the recesses 74, 76, the recess 82 and the recesses 86 are omitted. The rear wall 50 should be reinforced suitably in order to hold an outboard motor attachment.

The hull extension parts 92, 94 are illustrated in FIGS. 16 and 17, but only one part, namely 92 is described in detail in FIGS. 10 to 13. The other part 94 is similar thereto.

Referring to FIGS. 10 to 13 the hull extension part 92 is shown to be of fin shaped form having a converging pointed end 96 and a semi-oval plan longitudinal cross-section (FIG. 12). It has a vertical tapered ridge 98, which is adapted to fit into a correspondingly shaped recess 100 in the end wall 52 of the boat hull 30 (see FIG. 13). The boat hull 30 has a further similar recess 102 for the other extension part 94.

As is shown the recesses 100, 102 are tapered to narrow to above so that the hull extension part 92, 94, by way of their ridges, are locked in positive fashion due to water pressure acting on them, into the recesses.

The hull extension parts 92, 94 are also held in position by means of clamps at 104, 106 (see FIGS. 16 and 17), which are similar to the clamps 32 of FIG. 3.

FIG. 15 illustrates details of the mounting of a mast and the movement of the window or splash board 54. The mast 84 fits through a socket 108 provided in the mast board 78 fitted into the recesses 74, 76 and its bottom end fits into the blind hole 82 provided in the floor 44 of the boat hull 30.

The window or splash board 54, has a surrounding frame 110 (see FIGS. 1, 4, 7) and is hinged along the edge 56 to the front wall 52. It is movable from a position 55 in which it acts as a window on a canopy (see FIG. 2) to a position 53 where it acts as a splash board on a boat (be it a sailing or a motor boat). When in the latter position, it abuts against the formation edge 112 provided in the extension part 92 (and obviously a similar edge in the other extension part 94). A clamp is provided at 113 to hold the board 54 in this position. Also, when acting as a window a lock 114 is provided to keep it in closed position (see FIG. 2).

In FIG. 16 the various additional parts for a sailing boat 116 are shown. As illustrated a rudder 118, two seat benches 120, 122 and a mast 84 with a sail 124 are provided. The mast 84 fits into a socket 108 provided in the mast board 78, which fits into the recesses 74, 76 (see FIG. 15).

FIG. 17 shows the assembled sailing boat 116.

In FIG. 18 the boat hull 30.1 is shown when used as a motor boat 126. Here the outboard motor 128 with its propellor are shown to be fitted to the end wall 50.1 in normal manner.

The hull body and all other parts preferably are made of fibre glass but it is also possible to use other types of material.

As explained above, the invention provides a canopy for a truck or lorry, which easily can be converted into a sailing or motor boat.

We claim:

1. A convertible boat/canopy which is adapted to be selectively utilized as a boat or as a vehicle canopy comprising a body defined by a first wall forming a top wall of the canopy and a bottom wall of the boat, two longitudinal walls defining opposite sides of said boat/canopy, two end walls defining opposite ends of said boat/canopy, and one of said end walls carrying means for operating as a baffle plate when said boat/canopy is utilized as a boat and for operating as a closure element which is also positionable between spacer elements of a vehicle when said boat/canopy is utilized as a vehicle canopy.

2. The convertible boat/canopy as defined in claim 1 wherein said longitudinal and end walls define a peripheral terminal edge beyond which said closure element/baffle plate projects.

3. The convertible boat/canopy as defined claim 1 wherein said closure element is a window.

4. The convertible boat/canopy as defined in claim 1 wherein said closure element is movable.

5. The convertible boat/canopy as defined in claim 1 wherein said closure element is a transparent movable window.

6. The convertible boat/canopy as defined in claim 1 including means for pivotably moving said baffle plate/closure element between at least two positions when said boat/canopy is utilized as a boat and as a vehicle canopy.

7. The convertible boat/canopy as defined in claim 1 including a pair of bow extensions, means defined by said one end wall at opposite sides of said baffle plate for releasably coupling said bow extensions to said one end wall with said baffle plate therebetween, said coupling means includes slidably interconnected tapered tongues and recesses, and one of said tongues and recess being carried by said one end wall and converging in a direction away from said top/bottom wall and toward a terminal edge of said one end wall, but terminating short of the latter wall.

8. The convertible boat/canopy as defined in claim 1 including a pair of bow extensions, means for removably securing said bow extensions to said one end wall, and means for securing said baffle plate to at least one of said bow extensions.

9. The convertible boat/canopy as defined in claim 1 including a pair of bow extensions, means for removably securing said bow extensions to said one end wall, means for moving said baffle plate from its closure element position to its baffle plate position, and means for securing said baffle plate to at least one of said bow extensions.

10. The convertible boat/canopy as defined in claim 1 including a pair of bow extensions, means for removably securing said bow extensions to said one end wall, means for pivotably moving said baffle plate from its closure element position to its baffle plate position, and means for securing said baffle plate to at least one of said bow extensions.

11. The convertible boat/canopy as defined in claim 1 including means for moving said baffle plate/closure element between at least two positions when said boat/canopy is utilized as a boat and as a vehicle canopy.

12. The convertible boat/canopy as defined in claim 11 wherein said closure element is a window.

13. The convertible boat/canopy as defined in claim 11 including means for pivotably moving said baffle plate/closure element between at least two positions when said boat/canopy is utilized as a boat and as a vehicle canopy.

14. The convertible boat/canopy as defined in claim 11 including a pair of bow extensions, means defined by said one end wall at opposite sides of said baffle plate for releaseably coupling said bow extensions to said one end wall with said baffle plate therebetween, said coupling means include slidably interconnected tapered tongues and recesses, and one of said tongues and recess being carried by said one end wall and converging in a direction away from said top/bottom wall and toward a terminal edge of said one end wall, but terminating short of the latter wall.

15. The convertible boat/canopy as defined in claim 11 including a pair of bow extensions, means removably securing said bow extensions to said one end wall, and means for securing said baffle plate to at least one of said bow extensions.

* * * * *